United States Patent [19]
Horowitz

[11] 4,037,879
[45] July 26, 1977

[54] EMPTY AND LOAD SENSING VALVE

[75] Inventor: Charles Horowitz, Niles, Ill.

[73] Assignee: Sloan Valve Company, Franklin Park, Ill.

[21] Appl. No.: 696,059

[22] Filed: June 14, 1976

[51] Int. Cl.² .............................................. B60T 8/18
[52] U.S. Cl. ................... 303/23 R; 137/102; 137/627.5; 188/195
[58] Field of Search ............... 303/22 R, 23 R, 23 A, 303/28, 40; 188/195; 137/627.5, 102; 251/77

[56] References Cited
U.S. PATENT DOCUMENTS

| | | | |
|---|---|---|---|
| 2,362,931 | 11/1944 | Rodway | 303/23 R |
| 3,612,621 | 10/1971 | Scott | 303/23 R X |
| 3,671,086 | 6/1972 | Scott | 303/23 R |

FOREIGN PATENT DOCUMENTS 2,326,708  12/1974  Germany .......................... 303/28

Primary Examiner—George E. A. Halvosa
Attorney, Agent, or Firm—Kinzer, Plyer, Dorn & McEachran

[57] ABSTRACT

An empty-load valve structure for a railroad air brake system include a load sensing valve for sensing the loaded condition of a railroad vehicle and a pressure control valve. In one position of the load sensing valve, full pressure is applied through the pressure control valve to the vehicle brakes. In a second position of the load sensing valve, less than full pressure is applied through the pressure control valve to the vehicle brakes. In all positions of the load sensing valve, a piston movable within the pressure control valve is balanced by opposing air pressure created forces.

11 Claims, 4 Drawing Figures

EMPTY AND LOAD SENSING VALVE

SUMMARY OF THE INVENTION

The present invention relates to empty-load valve means for a railroad air brake system.

A primary purpose of the invention is an empty-load valve means including a load sensing valve for sensing the loaded condition of the railroad vehicle and a pressure control valve, controlled by two-way air conduit means with the load sensing valve, for supplying air, from the vehicle supply to the vehicle brakes, in accordance with the position of the load sensing valve.

Another purpose is a empty-load valve means of the type described in which the pressure control valve utilizes a piston, pressure balanced in all positions of the load sensing valve.

Another purpose is a simply constructed reliably operable empty-load valve means for a railroad vehicle.

Another purpose is a pressure control valve for use in a system of the type described which includes a piston carried peripheral seal member providing limited communication around the piston in one direction.

Another purpose is an empty-load valve means including a pressure control valve providing limited return of air to the ABD valve when the retainer valve is set for slow brake release.

Other purposes will appear in the ensuing specification, drawings and claims.

BRIEF DESCRIPTION OF THE DRAWINGS

The invention is illustrated diagrammatically in the folowing drawings wherein.

DESCRIPTION OF THE PREFERRED EMBODIMENT

Figure 1:
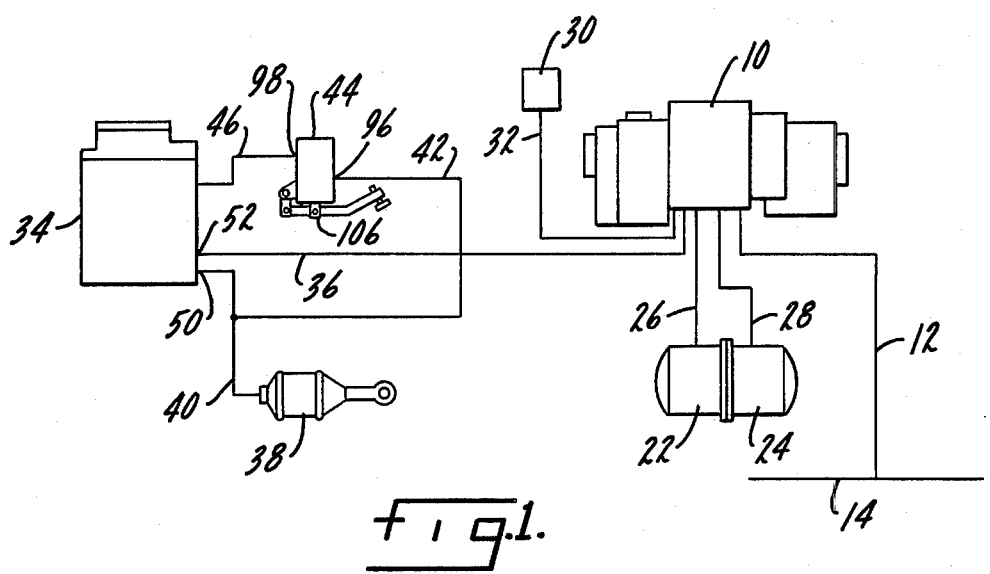
FIG. 1 is a diagrammatic illustration of a vehicle air brake system illustrating the valve means of the present invention.

As illustrated in FIG. 1, a typical railroad car air brake system includes an ABD valve 10 connected by a conduit 12, to the main air pipe 14 having angle cocks and hose couplings at opposite ends thereof. A combined dirt collector and cutoff cock may be connected between conduit 12 and the ABD valve 10, as is conventional. Auxiliary and emergency portions 22 and 24 of an air reservoir are connected by pipes 26 and 28 to the ABD valve 10 and a retainer valve 30 may similarly be connected to valve 10 through conduit 32.

A pressure control valve is indicated generally at 34 and is connected by a conduit 36 to ABD valve 10. A brake cylinder 38 is connected by pipe 40 to pressure control valve 34 with conduit 40 also being connected, through a pipe 42, to lead sensing valve 44. Load sensing valve 44 has a second connection, through pipe 46, to pressure control valve 34.

In operation of the railroad vehicle air brake system, the ABD valve will control the supply of pressure to pressure control valve 34 which will supply this pressure to brake cylinder 38 for applicaition of the brakes. Load sensing valve 44 will determine whether the car is empty or loaded and will control the supply of air pressure from valve 34 to the brake cylinder in accordance with the empty or loaded condition of the car.

Looking specifically at pressure control valve 34, the valve has a housing 48 having an outlet 50 connected to pipe 40 and an inlet 52 connected to pipe 36. A chamber 54 is formed within housing 48 and is in communication with outlet 50 through passage 56. A generally cylindrical shaped housing portion 58 mounts a reciprocal shuttle 60 biased by spring 62 to the position of FIG. 2. Exhaust port 64 is formed within a bushing 66 mounted by a ring 68 within cylindrical housing portion 58 with bushing 66 forming a seat for spring 62. Cylindrical portion 58 has a downwardly-turned lip 70 which forms a sealing surface for seal 72 carried by the inner end of shuttle 60. Thus, in the brake release position shown in FIG. 2, there is no communication between chamber 54 and a chamber 74 formed within cylindrical housing portion 58. However, there is communication between chamber 54 and exhaust port 64.

A piston 76 carrying a cup-shaped seal 78 at its periphery is reciprocal within chamber 54. Piston 76 carries a valving portion 80 adapted to seat upon seal 72, as described hereinafter, closing communication between chamber 54 and exhaust port 64, with movement of the piston also causing movement of the shuttle to open communication between chambers 74 and 54. Piston 76 has a piston portion 82 movable within a chamber 84 formed between housing 48 and an interior wall 86. Chamber 84 is in communication with pipe 46 through passage 88. The upper side of piston 76, forming a chamber 91 with wall 86, is in communication with inlet 52 through passage 90. Chamber 74 is in communication with inlet 52 through passage 92.

The load sensing valve has a housing 94 with an inlet 96 connected to pipe 42 and an outlet 98 connected to pipe 46. A chamber 100 if formed within housing 94 and a piston 102 is reciprocal within camber 100. A coil spring 104 biases piston 102 to the brake release position of FIG. 3. Piston 102 extends outwardly through housing 94 ahd has means thereon, indicated at 106, for connection to an arm which will be used to sense the load condition of the car. One means for connecting the load sensing valve is to mount it upon the car truck bloster with an arm connected to means 106 being positioned to sense the position of the side frame relative to the bolster.

Piston 102 includes an upwardly extending cylindrical portion 108 which extends within a second chamber 110 within housing 94. Piston 102 has a series of small ports 112 which are adapted to place the interior of cylindrical piston 108 in communication with inlet 96 through passage 114. Piston 102 carries a seal ring 116 at its periphery and housing 94 may have a seal ring 118 positoned to form a seal with cylindrical piston portion 108.

A second piston indicated at 120 is movalbe within chamber 110 and is urged by a coil spring 122 positioned within a cylindrical extension thereof in the opposite sense of the bias of piston 102 by spring 104. Piston 120 carries a seal member 124 which is in sealing engagement with the upper end 126 of cylindrical piston portion 108. Piston 120 carries a seal ring 128 at its periphery which is in sealing contact with the wall of chamber 110. A passage 130 connects housing outlet 98 with chamber 110 as described in detail hereinafter.

Figure 2:
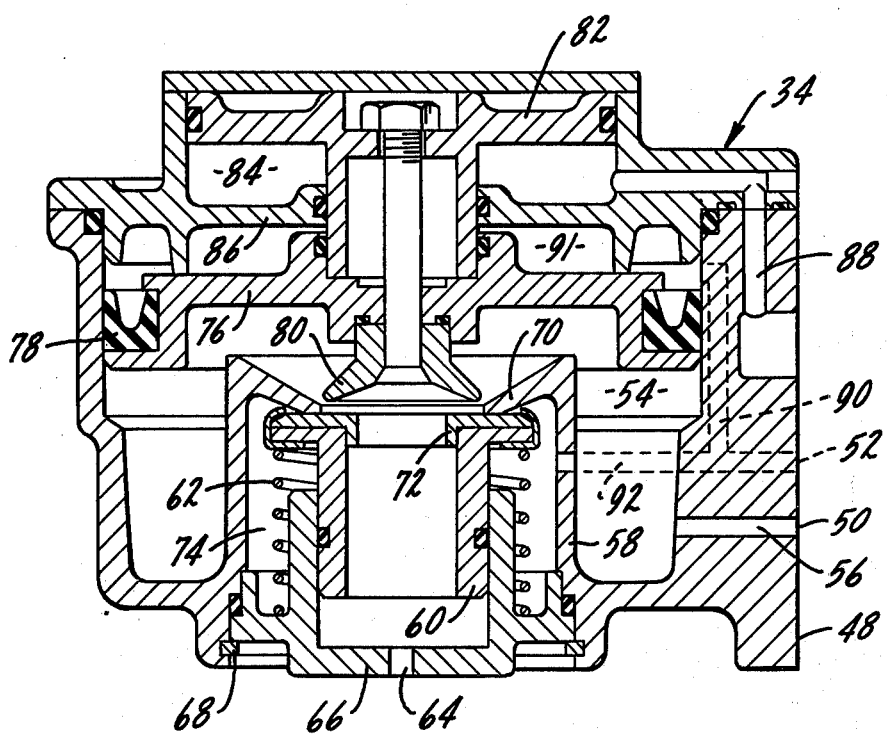
FIG. 2 is an axial section through the pressure control valve showing the valve in the brake release position.
Figure 3:
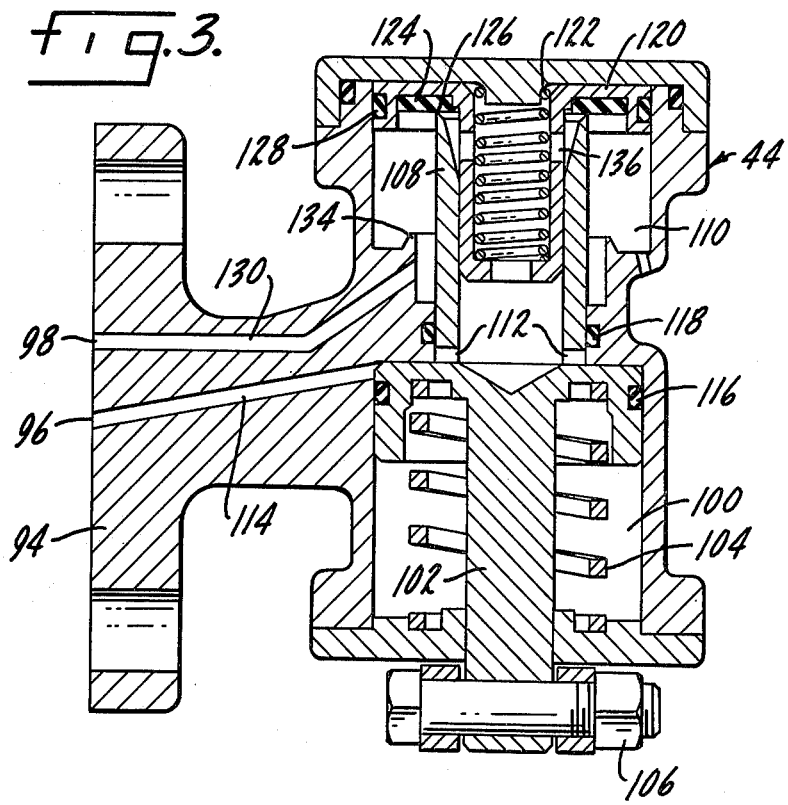
FIG. 3 is an axial section through the load sensing valve showing the valve in the brake release position.

In operation, when the brakes are released, valves 34 and 44 are in the positions shown in FIGS. 2 and 3. When air pressure is supplied through ABD valve 10 to pipe 36, passages 90 and 92 will pass such pressure to chambers 74 and 91. Piston 76 will move downward, as shown in the drawings, with the result that valving means 80 will first seat upon seal 72, closing communication between chamber 54 and exhaust port 64. Continued downward movement of piston 76 will move shuttle 60 in a downward direction, thereby releasing the seal between lip 70 and seal 72, to open communication between chamber 74 and chamer 54. Thus, the supplied air pressure will be present in chamber 54 beneath piston 76 and in chamber 91 above piston 76. The piston will be pressure-balanced and it will have moved to a position establishing communication between inlet 52 and outlet 50 of valve 34. The pressure supplied at outlet 50 will be directed to brake cylinder 38 to operate the brakes in the normal manner.

Such pressure will also be supplied to load sensing valve 44. The pressure supplied to this valve through passage 114 will cause piston 102 to move downwardly until its load sensing means contacts the car truck side frame. Pressure will flow through passage 114, through ports 112, into the interior of cylindrical portion 108. As piston 102 moves in a downward direction, piston 120 will follow and there will be no separation between lip 126 of piston portion 108 and seal 124. The pressure within piston 120 will not pass to passage 130 and to pipe 46 which is connected back to the pressure control valve. Accordingly, full pressure will be supplied by pressure control valve 34 to the brake cylinder. The pressure control valve merely functions as a relay valve and does not reduce the available brake applying pressure.

Figure 4:
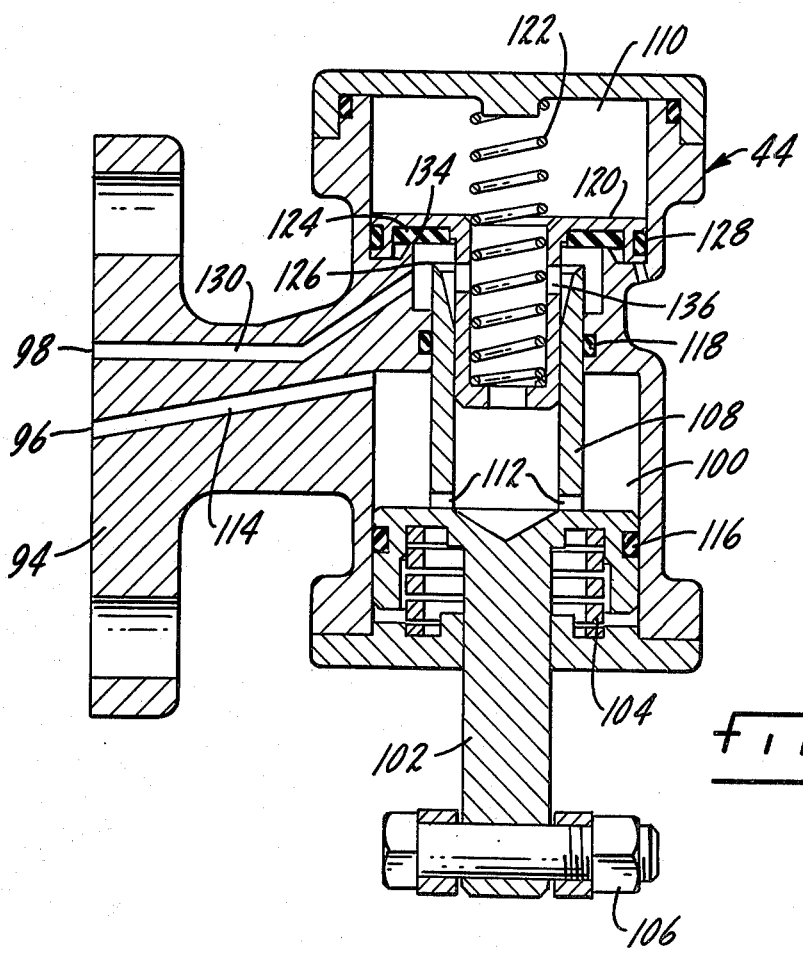
FIG. 4 is an axial section through the load sensing valve showing the valve in a limited brake applied position.

When the car is in an empty condition, initially the sequence of operation is as described above. However, in this case, piston 102 of load sensing valve 44 moves to the position of FIG. 4. Piston 102 compresses spring 104 in response to air pressure supplied through passage 114 and into the interior of cylindrical portion 108. Piston 120 is limited in its downward movement by a rim 134 extending into chamber 110. Thus, pistons 102 and 120 are separated, breaking the seal between lip 126 and seal 124. Breaking of this seal opens communication between passage 130 and ports 136 in piston 120 with the result that passage 130 is placed in communication with passage 114 through the two pistons. Air pressure is directed backk through pipe 46, through pressure control valve passage 88 to chamber 84 beneath piston portion 82 and above wall 86. This pressure will provide an upwardly-directed force on piston portion 82 which upwardly-directed force combines with the pressure within chamber 54 to balance the pressure created in a downward direction on piston 76 through inlet passage 90. As piston 76 must be balanced, full air pressure supplied from the ABD valve is balanced by the combination of pressure at outlet chamber 54 and pressure in chamber 84. Thus, the outlet pressure supplied to the brake cylinder is decreased and in some applications may be only 60 percent of the full available pressure. The invention obviously should not be limited to this particular percentage. What is important is that the pressure available at the outlet chamber be reduced by the pressure within chamber 84.

As is well known in the art, at times there will be a slow release of the brakes, rather than the conventional release in which pressure from brake cylinder 38 is exhausted through the pressure control valve and its exhaust port 64. In a slow release the retainer valve is utilized and at least a portion of the pressure within chamber 54, returning from brake cylinder 38, will pass upwardly, past cup-shaped seal 78, into chamber 91 and then trhough pipe 36 to the ABD valve. In such a slow release condition, a portion of the pressure is exhausted through port 64 and the other portion, as described, passes seal 78 and returns to the ABD valve. The cup-shaped seal will not permit the passage of air pressure from chamber 91 to chamber 54 because of the specific configuration of the seal, but it can pass pressure in the opposite direction.

Of particular advantage in the invention is the simplified construction of both the pressure control valve and the load sensing valve. The pressure control valve provides, in essence, a relay valve when the car is fully loaded as there is a 1:1 ratio between inlet and outlet air pressure. Piston 76 is balanced in all postitions of the valve and pressure returned from the load sensing vavle is utilized to reduce outlet pressure when the car is empty.

Whereas the preferred form of the invention has been shown and described herein, it should be realized that there may be many modifications, substitutions and alterations thereto.

The embodiments of the invention in which an exclusive property or privilege is claimed are defined as follows:

1. Empty-load valve means for a railroad air brake system including a load sensing valve for sensing the loaded condition of a railroad vehicle and a pressure control valve, two way air conduit means connecting said pressure control valve and load sensing valve, said pressure control valve including a housing having an inlet connected to the vehicle air supply, an outlet connected to the brake applying means and an exhaust port, a first chamber in said housing, a piston movable in said first chamber, said inlet and outlet being connected to said first chamber on opposite sides of said piston, means carried by said piston for controlling communication between said inlet and outlet, a second chamber in said housing connected to said load sensing valve through said two-way air conduit means, a portion of said piston being positioned to receive an air pressure created force from said second chamber whereby the position of said means for controlling commumnciation between said inlet and outlet is controlled by the pressure in said second chamber derived from said load sensing valve, said load sensing valve including a housing having an inlet and an outlet connected to said two-way air conduit means, separate independently movable telescopically mounted pistons in said housing, one of said independently movable pistons adapted to be placed in load sensing relation with a portion of a railroad vehicle, spaced coaxial springs urging said pistons in opposte directions, said pistons cooperating to control communication between said housing inlet and outlet.

2. The valve means of claim 1 further characterized in that said piston has a portion thereof movable within said second chamber.

3. The valve means of claim 2 further characterized in that pressure in said second chamber and pressure at said outlet, creating forces to move said piston in one direction, are balanced by the pressure within said first chamber on the inlet side thereof.

4. The valve means of claim 1 further characterized by and including a shuttle movable in said housing, a spring biasing said shuttle to a position normally closing communication between said inlet and outlet and opening communication between said outlet and said exhaust port.

5. The valve means of claim 4 further characterized in that said means carried by said piston for controlling communication between said inlet and outlet is positioned to cause movement of said shuttle in response to pressure applied at said inlet.

6. The valve means of claim 1 further characterized by and including a peripheral cup-shaped seal carried by said piston and in sealing contact with said housing, said seal permitting limited communication, in one direction, between opposite sides of said piston.

7. The valve means of claim 1 further characterized by and including a third chamber in said housing and connected to said inlet, a shuttle movable in said third chamber, and normally closing communication between said third chamber and said first chamber and opening communication between said first chamber and said exhaust port.

8. The valve means of claim 7 further characterized in that said shuttle is positioned to move coaxially of said piston, with said means carried by said piston for controlling communication between said inlet and outlet contacting said shuttle for movement to open communication between said third and first chambers.

9. The valve means of claim 8 further characterized by and including a spring normally biasing said shuttle to a position closing communication between said third and first chambers.

10. The valve means of claim 1 further characterized by and including means on the housing limiting movement of at least one of said independently movable pistons.

11. The valve means of claim 10 further characterized by and including a seal carried by one of said independently movable pistons and a cooperating seal surface carried by the other independently movable piston for controlling communication between said load sensing valve inlet and outlet.

* * * * *